US007066273B2

(12) United States Patent
Tan

(10) Patent No.: US 7,066,273 B2
(45) Date of Patent: Jun. 27, 2006

(54) APPARATUS AND METHODS FOR SENSING OF FIRE AND DIRECTED FIRE SUPPRESSION

(76) Inventor: Benjamin Tan, 3161 Driggs Ave., Rosemead, CA (US) 91770

( * ) Notice: Subject to any disclaimer, the term of this patent is extended or adjusted under 35 U.S.C. 154(b) by 151 days.

(21) Appl. No.: 10/474,297

(22) PCT Filed: Apr. 5, 2002

(86) PCT No.: PCT/US02/10557

§ 371 (c)(1),
(2), (4) Date: Oct. 3, 2003

(87) PCT Pub. No.: WO02/081031

PCT Pub. Date: Oct. 17, 2002

(65) Prior Publication Data

US 2004/0129434 A1 Jul. 8, 2004

Related U.S. Application Data

(60) Provisional application No. 60/281,956, filed on Apr. 6, 2001, provisional application No. 60/327,131, filed on Oct. 3, 2001.

(51) Int. Cl.
*A62C 37/08* (2006.01)
*A01G 27/00* (2006.01)

(52) U.S. Cl. ............................ 169/37; 169/40; 169/41; 169/23; 239/67; 239/69

(58) Field of Classification Search .................. 169/37, 169/40, 41, 23; 239/67–73; 250/339.15, 250/339.14; 340/578

See application file for complete search history.

(56) References Cited

U.S. PATENT DOCUMENTS 3,866,687 A * 2/1975 Banner ........................ 169/61

(Continued)

*Primary Examiner*—Davis Hwu

(74) *Attorney, Agent, or Firm*—Khorsandi Patent Law Group, A Law Corporation; Marilyn R. Khorsandi

(57) ABSTRACT

The present invention provides apparatus and methods for pro-active, intelligent fire suppression and/or control using a micro-controller that is communicatably connected to at least one fire-energy detection sensor and to at least one fire suppression device. The present invention provides apparatus and methods for sensing the exact direction of a fire as well as a regional location of a fire. The present invention provides apparatus and methods for directing a fire suppressant at the source of the flame. As depicted in FIG. 1*a*, the present invention provides fine protection apparatus (10) for identifying the existence of a fire hazard and for determining the exact direction and regional location of the file hazard by using multiple infrared (IR) detectors. A first IR detector (20) with a wide angle view of an area of coverage corresponding to an area requiring fire protection will be continuously queried by a micro-controller (100). During normal operation, the wide-angle IR detector (20) will be located in no specific position but will be generally pointed towards the area requiring fire protection. The present invention further provides a second IR detector (30) with a narrow-angle field of view that is mounted on a movable platform (45) comprising an elevation manipulator (50) and an azimuthal manipulator (60). The elevation manipulator (50) of the movable platform (45) is connected to a second stepper-motor (91). The second stepper-motor (91) controls the elevation manipulator (50). The outer edge of the circumference of the azimuthal manipulator (60) of the movable platform (45) forms a first cog wheel (61). The first cog wheel (61) contacts a second cog wheel (62) which is connected to and driven by a first stepper-motor (90).

5 Claims, 12 Drawing Sheets

U.S. PATENT DOCUMENTS

| | | | | | |
|---|---|---|---|---|---|
| 4,173,306 | A | | 11/1979 | Ridgway | |
| 4,845,629 | A | | 7/1989 | Murga | |
| 5,074,468 | A | | 12/1991 | Yamamoto et al. | |
| 5,664,630 | A | | 9/1997 | Meyer et al. | |
| 6,039,124 | A | | 3/2000 | Bowman et al. | |
| 6,046,452 | A | * | 4/2000 | Castleman et al. | 250/339.15 |
| 6,057,549 | A | * | 5/2000 | Castleman | 250/339.15 |
| 6,064,064 | A | * | 5/2000 | Castleman | 250/339.15 |
| 6,078,050 | A | * | 6/2000 | Castleman | 250/339.15 |
| 6,111,511 | A | * | 8/2000 | Sivathanu et al. | 340/577 |
| RE37,493 | E | | 1/2002 | Thomas | |
| 6,515,283 | B1 | * | 2/2003 | Castleman et al. | 250/339.15 |

* cited by examiner

| Gas | Temperature K | Total pressure atm | Partial pressure atm | (Partial pressure)× (Path length) atm m |
|---|---|---|---|---|
| $CO_2$ | 1389 | 10 | 10 | 3.9 |
| $H_2O$ | 833 | 2 | 2 | 0.77 |
| $CH_4$ | 833 | 3.2 | 0.8 | 0.31 |

| | | | |
|---|---|---|---|
| Alternate Embodiment | | | |
| Pan/Tilt Assembly | PTM-1 | CSI - SPECO 200 New Highway, P.O. Box 726 Amityville, NY 11701-0726 | |
| Pan/Tilt Controller | PTC-1 | CSI - SPECO 200 New Highway, P.O. Box 726 Amityville, NY 11701-0726 | |
| Micro-controller | MCB517AC | Keil Elektronick GmbH | |
| Relay | 812F-1C-S | Mouser Electronics | http://www.mouser.com (800)346-6873 |
| FET | 511-STD12N05 | Mouser Electronics | http://www.mouser.com (800)346-6873 |
| Diode | 1N4002 | NTE | 44 Farrand St., Bloomfield, NJ 07003 (800)631-1250 |
| IR Detector | B-1 | N.E.P. | 253 Mansfield Ave., P.O. Box M, Norton, MA 02766-0927 (888)727-7273 |
| Rail to Rail Op-Amp | TS-922 | ST Micro electronics | http://www.st.com |
| Selonide Valve | EV-2-6 | Clippard Instrument Labatory, Inc., 7390 Colerain Ave., Cincinnati, Ohio 45239 USA (513)521-4261 www.clippard.com | |
| Original Embodiment | | | |
| Micro-controller | MCB517AC | Keil Elektronick GmbH | |
| Stepper Motor | | | Part of a Floppy Drive from computer |
| Quad Motor Drive | ULN2066B | ST Micro electronics | http://www.st.com |
| FET Driver | NTE2395 | NTE | 44 Farrand St., Bloomfield, NJ 07003 (800)631-1250 |
| Diode | 1N4002 | Phillips ECG | DPDT 10 Amps, 28VDC/240VAC |
| Relay | RLY1942F | Mouser Electronics | http://www.mouser.com (800)346-6873 |
| IR Detector | B-1 | N.E.P. | 253 Mansfield Ave., P.O. Box M, Norton, MA 02766-0927 (888)727-7273 |
| Rail to Rail Op-Amp | TS-922 | ST Micro electronics | http://www.st.com |

FIG. 7

APPARATUS AND METHODS FOR SENSING OF FIRE AND DIRECTED FIRE SUPPRESSION

CROSS REFERENCE TO RELATED APPLICATIONS

This is a U.S. National Stage Application of International Application No. PCT/US02/10557, International Filing Date Apr. 5, 2002, which claims benefit of U.S. Provisional Patent Application, Ser. No. 60/281,956, filed Apr. 6, 2001, and U.S. Provisional Patent Application, Ser. No. 60/327,131, filed Oct. 3, 2001. The disclosures of U.S. Provisional Patent Application Ser. No. 60/281,956 entitled “Infrared Energy Sensing and Directed Fire Protection System”, filed on Apr. 6, 2001, and U.S. Provisional Patent Application Ser. No. 60/327,131 entitled “Apparatus and Methods for Sensing of Fire and Directed Fire Suppression”, filed Oct. 3, 2002, are incorporated for all purposes herein in full by reference as if stated in full herein.

FIELD OF THE INVENTION

The field of the present invention is fire detection and suppression apparatus and methods.

BACKGROUND OF THE INVENTION

Fire suppression equipment has been used for some time to suppress and control fires. In its most basic form, fire suppression equipment typically includes a spray nozzle attached to a supply of fire suppressant (water) at a relatively high pressure. Traditional sprinkler-based fire-suppression systems typically remain inactive and become operational only when the heat generated by a fire causes a low temperature solder within one of the sprinkler’s nozzles to melt (“thermal-reactive” fire suppressant systems). As the solder becomes molten, the stopper that previously prevented the flow of fire suppressant is released and the fire suppressant is allowed to flow.

The National Fire Protection Association (NFPA) issues a standard known as NFPA-13 (also known as “Standard for the Installation of Sprinklers Systems”). NFPA-13 defines requirements for the types of sprinkler systems described above.

NFPA-13 recognizes three general hazard categories for sprinkler systems: light, ordinary and extra hazard. As defined by NFPA-13, light hazard occupancies are those situations where the quantity and combustibility is low and fires with relatively low rates of heat-release are expected. Ordinary hazard occupancies are those situations where the quantity and/or combustibility of the contents is equal to or greater than that of the light hazard, ranging from low to high, where the quantity of combustibles is moderate and stock piles so not exceed twelve feet, such that fires with moderate to high rates of heat release are expected. Extra hazard occupancies are those where quantity and combustibility of contents is very high and flammable or where combustible liquids, dust, lint or other materials are present, such that the probability of rapidly developing fires with high rates of heat release is very high.

Many sprinkler systems specified in NFPA-13 were designed to control a fire rather than to extinguish it. Such sprinkler systems are generally designed to limit the size of a developing fire and to prevent it from growing and spreading beyond the general area of origin. The concept of fire suppression was only started when the first Early Suppression Fast Response (ESFR) sprinklers were introduced in 1988. This fire suppression concept evolved by examining how the effects of sprinkler sensitivity and water distribution characteristics could be combined to achieve early fire suppression.

ESFR sprinklers achieve fire suppression by responding more quickly to fire hazard than standard sprinklers and provide adequate discharge to suppress the fire before a severe fire plume develops. The concept is that if a sufficient amount of fire suppressant can be discharged in the early phases of a fire and if the fire suppressant penetrates the developing fire plume, fire suppression can be achieved. Early suppression is determined by satisfying the following three factors: thermal sensitivity, required delivery density (RDD), and actual delivery density (ADD).

Response time index (RTI) is a measurement that is used to quantify the thermal sensitivity of a sprinkler system. RTI is a function of the thermal sensitivity of the operating element of the fire suppressant system, the temperature rating of the fire suppressant system, and the distance of the fire suppressant system relative to the fire hazard.

It is recognized in the art of fire suppression equipment that traditional thermal-reactive fire suppression equipment is subject to thermal lag. Thermal lag is associated with the mass of the traditional thermal-sensitive operating element to sense heat in gases from a fire. Thermal-sensitive sensors of traditional thermal-reactive fire protection systems rely on detecting the heat of gases from a fire that accumulate near the sensor. It is the sensing of the heat from such gases that is used by traditional thermal-reactive fire suppression systems to activate alarms and to activate the release of fire suppressants. In order to activate a traditional thermal-reactive fire suppression system, the temperature of the gases released from the fire that accumulate near the sprinkler head must reach a very high value before the sprinkler system will be activated.

Due to the thermal lag in a traditional thermal-reactive fire suppressant system, the response time of such equipment is long. Because the response time is long, a fire can develop into a significant fire hazard before the fire suppressant system is activated. On the other hand, a thermal-reactive fire suppressant system with extra-sensitive thermal-sensitive elements can be prematurely activated, such as by a strong fire plume causing the activation of a sprinkler far away from the fire hazard. If a fire suppressant system sprinkler is activated prematurely, such as a sprinkler that is far from the fire source and not directed to, or not configured to spray fire suppressant with sufficient force to reach, the fire source, such premature activation is not an aid in the suppression of the fire hazard. The need to quickly respond to the fire hazard and the need to prevent inadvertent activation of nearby nozzles render traditional methods of fire detection ineffective.

Once activated, a fire suppressant system needs to douse the fire with sufficient fire suppressant such that the actual delivery density (ADD) over the ensuing fire exceeds the required delivery density (RDD) to suppress the fire. The RDD depends on the strength of the ensuing fire and the combustibility of the materials stored in the vicinity requiring fire protection. ADD is a function of fire plume velocity, momentum and size of the water droplets, and the distance that water must travel from the sprinkler. Once activated, the nozzle from a traditional fire suppressant system spreads the water in a generally dispersive circular pattern and typically reaches the fire with only the aid of gravity. Due to the almost random nature of the type of a distribution system, the delivery of the water on the fire hazard is not very effective.

These three measurements—RTI, RDD, and ADD—are the controlling factors that define the time-dependent nature of early fire suppression. The earlier the water is applied to a growing fire, the lower the RDD will be and the higher the ADD will be. In other words, the faster the sprinkler response (the lower the RTI), the lower the RDD and the higher the ADD. Conversely, the later the water is applied (the higher the RTI), the higher the RDD and the lower the ADD.

When the ADD is less than the RDD, the sprinkler discharge is no longer effective enough to achieve early fire suppression. Thus, it is clear that early fire suppression depends on the ability of a fire suppression system to detect a fire hazard quickly and to react with the proper response to ensure that the sufficient fire suppressant necessary to suppress the fire is delivered.

SUMMARY OF THE INVENTION

The present invention provides apparatus and methods for pro-active, intelligent fire detection and suppression and/or control using a micro-controller that is communicatably connected to at least one fire-energy detection sensor and to at least one fire suppression device. Use of the word “micro-controller” herein is exemplary and should be understood by someone with ordinary skill in the art to represent computer devices that can be programmed to perform logic functions.

The present invention provides apparatus and methods for sensing the exact direction of a fire as well as a regional location of a fire. The present invention provides apparatus and methods for directing a fire suppressant at the source of the flame. The present invention provides apparatus and methods for detecting the intensity/strength of the fire by using multiple narrow-angle detectors and adjusting the spray pattern and pressure of the spray to achieve maximum suppression the fire. The present invention provides apparatus and methods for storing data about a fire in a memory storage device.

The exemplary embodiment of the present invention provides apparatus and methods for pro-active, intelligent fire detection and suppression and/or control using a first wide-area view infrared (IR) detector (the words “detector” and “sensor” are used interchangeably herein) and a second narrow-angle IR detector, both communicatably connected to a micro-controller wherein the micro-controller is communicatably connected to one or more fire suppressant dispersion devices. The first IR detector is mounted with a clear, wide-angle view of an area requiring fire protection.

The present invention uses a second IR detector with a narrow-angle view. The micro-controller is configured with an analog-to-digital converter to detect changes in electrical characteristics of the IR detectors to detect the presence of a fire and to identify an exact direction and regional location of a fire. Once the direction and regional location of the fire hazard are known to the micro-controller, the nozzle attached to a supply of fire suppressant can be directed by the micro-controller to apply the fire suppressant directly at the source of the fire and at a pressure and in a pattern appropriate for the regional location of the fire source without wasting the limited supply of fire suppressant or damaging other regions that are not affected by the fire hazard.

BRIEF DESCRIPTION OF THE DRAWINGS

These and other features of the present invention are more fully set forth in the following description of exemplary embodiments of the invention. The description is presented with reference to the accompanying drawings in which:

FIG. 7 is a list of parts used in assembling exemplary and alternative exemplary embodiments of the present invention.

DETAILED DESCRIPTION OF THE INVENTION

Figure 1A:
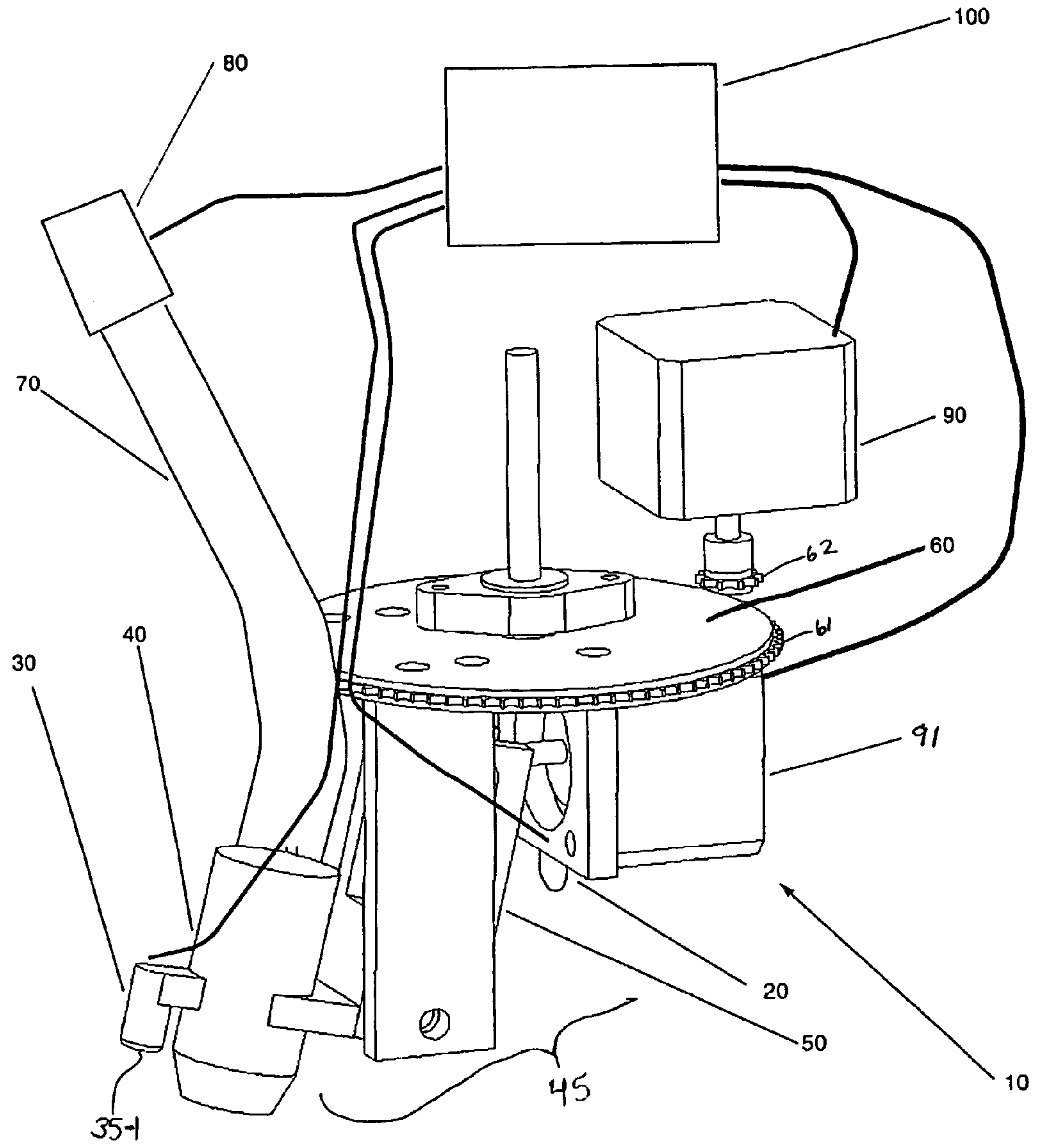
FIG. 1*a* is a perspective view of an exemplary fire detection and suppression apparatus embodying features of the present invention.

As depicted in FIG. 1*a*, the present invention provides fire protection apparatus 10 for identifying the existence of a fire hazard and for determining the exact direction and regional location of the fire hazard by using multiple infrared (IR) detectors. A first IR detector 20 with a wide-angle view of an area of coverage corresponding to an area requiring fire protection will be continuously queried by a micro-controller 100. During normal operation, the wide-angle IR detector 20 will be located in no specific position but will be generally pointed towards the area requiring fire protection.

Someone with ordinary skill in the art will understand that IR detectors, and certain other detectors, such as photo-resistors, are electromagnetic wavelength-based detectors as opposed to thermal-based detectors. The use of electromagnetic wavelength-based detectors is exemplary and as explained in more detail below is not a limitation of the invention.

An embodiment of the invention that uses electromagnetic wavelength-based detectors as the detection devices will not be subject to thermal lag. That is because the activation mechanism of electromagnetic wavelength-based detectors, such as IR detectors and photo-resistors, is electromagnetic light energy. Therefore, detection can occur almost instantaneously (at the speed of light), as opposed to detection subject to thermal lag as in the case of thermal-sensitive detectors.

By using IR detectors, the presence of heat (fire) can be detected as quickly as the temperature of any object within the viewing area of the IR detector increases as little as 10 degrees Centigrade above its surrounding or set to any level of sensitivity as required by design. Coupling this quick fire detection method with the ability of the present invention to locate and apply the fire suppressants directly towards the fire source, the likelihood of suppressing and/or extinguishing the fire will be substantially increased. In addition, by not wasting the limited supply of fire suppressant where it is not necessary, a fire protection system in the vicinity of the fire will not be deprived of a limited supply of fire suppressant material. Also, by not applying fire suppressant where it is not necessary, unnecessary damage to property resulting form the fire protection system is minimized or eliminated.

Once any object within the view of the wide-angle IR detector 20 begins to burn, the thermal energy of the fire will reach the wide-angle IR detector by radiation and will alter the electrical characteristics of the wide-angle IR detector 20. For a typical occupancy, the temperature of a developing fire hazard is from 600° C. to 1000° C.; at these temperatures, 80% of radiant energy occupies the range between 2.3 μm to 3.3 μm. In the exemplary embodiment of the present invention, in order to ensure that the thermal radiation from the fire hazard is detected and to ensure that other sources of thermal radiation not indicative of a fire hazard are rejected, a detector with maximum sensitivity to thermal radiation between 2.3 μm and 3.3 μm would be used.

Figure 3:
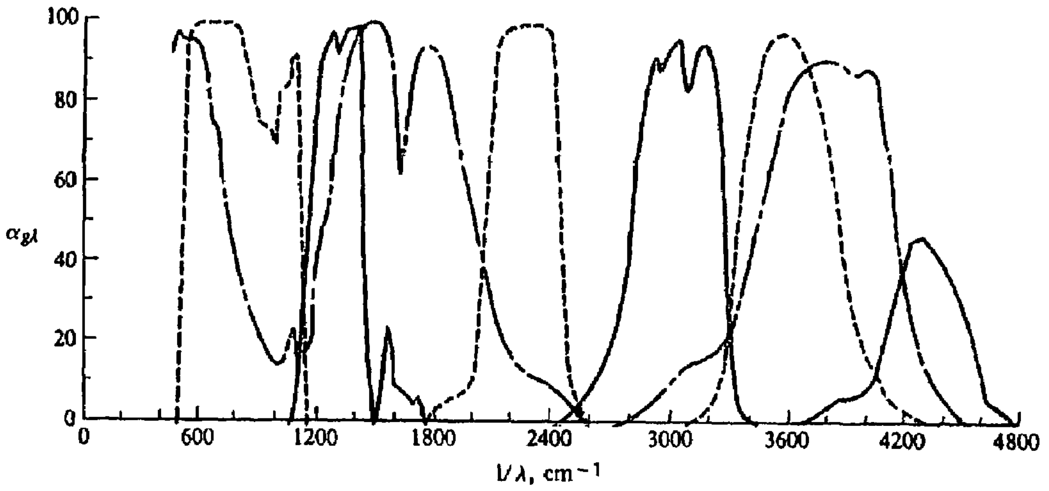
FIG. 3 is a graph depicting transmission of thermal radiation through various materials expected to be present in an exemplary room requiring fire protection.

In addition, the gas products of combustion, as well as other gases expected to be present, in the area requiring fire protection could absorb the thermal energy preventing the thermal radiation from the fire hazard from reaching the detector. Absorbivity of sample gases as a function of wave number (1/wavelength) is depicted in FIG. 3. To ensure that the energy from an ensuing fire is detected, the operating wavelength of the detector would be selected such that it would be sensitive to thermal radiation produced from a fire and that would be transmissive in the environment expected or produced by the fire hazard. For example, by selecting 4.0 um as the operating wavelength of the detector, detection of IR radiation through Carbon Dioxide ($CO_2$), Methane and water could be maximized. In an alternative exemplary embodiment, instead of a single wide-angle IR detector, multiple IR detectors with different wavelengths of peak sensitivity, or a detector with multiple elements (multi-color detector), would be used to achieve the above-described requirements.

The IR energy of a fire source will alter the electrical resistivity in an IR detector, or will generate a small amount of electrical current in an IR detector proportional to the amount of radiant energy generated by the fire hazard. Both types of changes (electrical resistivity and electrical current) in electrical characteristics in an IR detector can be detected using a simple electrical circuit and an analog-to-digital (AD) converter. In the exemplary embodiment, both the micro-controller 100 and the A/D Converter are integral parts of a development tool, Micro-controller model MCB517AC, commercially available from a German company known as Keil Elektronick GmbH with U.S. distributors. That is, in the exemplary embodiment of the invention, the AD converter is included as an integral part of the micro-controller 100. It will be understood by someone with ordinary skill in the art that the use of this particular micro-controller model is exemplary and is not a limitation of the invention. The major components used in building the exemplary embodiment depicted in FIG. 1*a* and the relevant commercially available sources are listed in FIG. 7 under the title of “Original Embodiment”.

The micro-controller 100 will continuously monitor the magnitude of the electrical-characteristic change in the first IR detector 20 as measured by the electrical circuit and as identified to the micro-controller 100 by the AD converter.

A pre-established magnitude of electrical-characteristic change is stored in a memory of the micro-controller 100 signifying a level indicative of a fire. The micro-controller 100 is programmed to check each electrical-characteristic change as measured by the electrical circuit and as identified to the micro-controller 100 by the AD converter against the pre-established electrical-characteristic change magnitude. If the micro-controller 100 encounters a situation in which the electrical-characteristic change exceeds the pre-established electrical-characteristic change magnitude, the micro-controller 100 will be programmed to activate an alarm connected to or otherwise in communication with the micro-controller 100 and would proceed with actions described in more detail below to suppress the fire.

Continuing with FIG. 1*a*, the present invention further provides a second IR detector 30 with a narrow-angle field of view that is mounted on a movable platform 45 comprising an elevation manipulator 50 and an azimuthal manipulator 60. The elevation manipulator 50 of the movable platform 45 is connected to a second stepper-motor 91. The second stepper-motor 91 controls the elevation of the elevation manipulator 50. The outer edge of the circumference of the azimuthal manipulator 60 of the movable platform 45 forms a first cog wheel 61. The first cog wheel 61 contacts a second cog wheel 62 which is connected to and driven by a first stepper-motor 90.

In the first exemplary embodiment described here in connection with FIG. 1*a*, stepper motors (elements 90 and 91 in FIG. 1*a*) are used to control the azimuthal and elevational sweeps. In an alternative exemplary embodiment, such as the one depicted in FIG. 1*b* , synchronous motors (elements 90-1 and 91-1 in FIG. 1*b*) are used. It will be understood by someone with ordinary skill in the art that the particular type of motor used in the exemplary and alternative exemplary embodiments are illustrative and are not a limitation of the invention. Further, it will be understood by someone with ordinary skill in the art that the manner in which the micro-controller 100 interfaces with the motors controlling the azimuthal and elevational sweeps will differ somewhat depending on the type of the motor used.

If the micro-controller 100 detects an electrical-characteristic change to the first (wide angle) IR detector 20 that exceeds the pre-established electrical-characteristic change magnitude, the micro-controller 100 will activate the second (narrow angle) IR detector 30 and the stepper-motors 90 and 91. The micro-controller 100 is programmed to direct the first stepper-motor 90 to move the azimuthal manipulator 60 in azimuthal directions. The micro-controller 100 is programmed to direct the second stepper-motor 91 to move the elevation manipulator 50 in elevational directions. The combined azimuthal and elevational movements of the activated second (narrow angle) IR detector 30 as described in more detail below, will sweep, or scan, the view of the second (narrow angle) IR detector 30 in the general direction of the heat source detected by the first (wide angle) IR detector 20 until the direction and regional location of a maximum IR energy source is detected.

The micro-controller 100 is programmed to direct the first stepper-motor 90 to first sweep, or scan (the words "sweep" and "scan" are used interchangeably herein), the view of the second narrow-angle IR detector 30 assembly in an azimuthal direction. After directing the first stepper-motor 90 to sweep the second narrow-angle IR detector 30 assembly in an azimuthal direction, the micro-controller 100 will continuously monitor the electrical characteristics of the narrow-angle IR detector 30. The micro-controller 100 is programmed to identify an azimuthal direction at which the electrical characteristics of the second narrow-angle IR detector 30 indicate maximum IR energy. The micro-controller 100 is programmed to identify as the azimuthal direction of the fire hazard the azimuthal direction corresponding to the direction of maximum IR energy.

Once the azimuthal direction of the fire has been established, the micro-controller 100 is programmed to direct the first stepper-motor 90 to point the narrow-angle IR detector 30 at the azimuthal direction of the fire hazard; the second stepper-motor 91 is instructed to then sweep the narrow-angle IR detector 30 in elevational directions while maintaining the azimuthal direction of the narrow-angle IR detector 30 at the azimuthal direction of the fire hazard. While remaining stationary at the azimuthal direction of the fire hazard, and while sweeping the narrow-angle IR detector 30 in elevational directions, the micro-controller 100 will continuously monitor the electrical characteristics of the narrow-angle IR detector 30. The micro-controller 100 is programmed to determine an elevational direction at which the electrical characteristics of the second narrow-angle IR detector 30 indicate maximum IR energy. To do that, the micro-controller 100 is programmed to identify as the elevational direction of the fire hazard the elevational direction corresponding to the direction of maximum IR energy. The intersection of the azimuthal direction and the elevational direction indicates the exact position of the fire. The micro-controller 100 is programmed to identify as the exact position of the fire hazard the intersection of the azimuthal direction of the fire hazard and the elevational direction of the fire hazard.

Figure 2A:
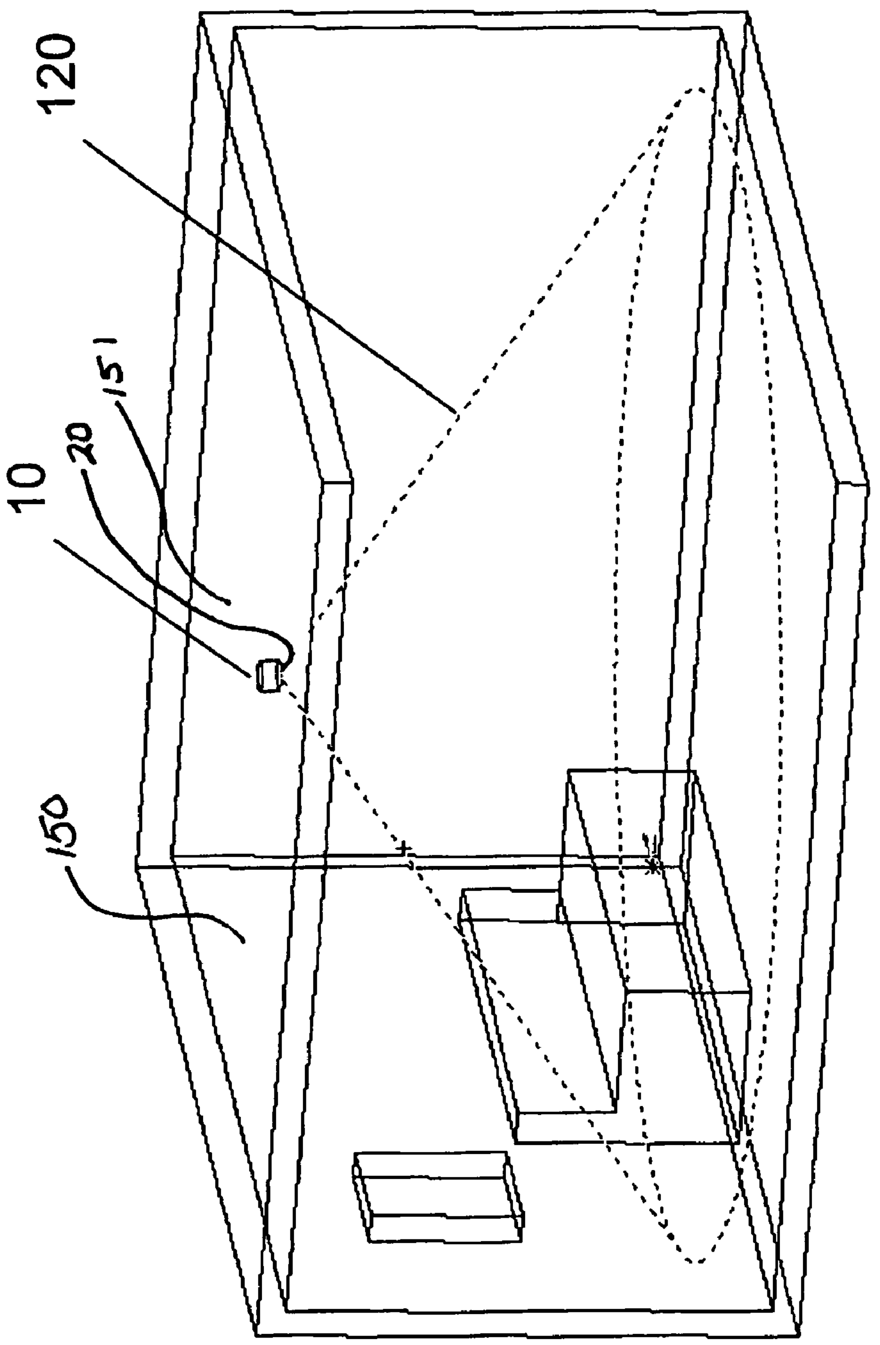
FIG. 2*a* is a perspective view of an exemplary wide angle cone-region view of a continuous scan of an exemplary room by a wide angle IR detector of an exemplary embodiment of the present invention.

FIGS. 2*a* through 2*e* depict stages of operation of an device embodying the features of the present invention to detect and suppress a fire hazard. FIG. 2*a* shows a perspective view of an exemplary wide angle cone-region view 120 of a continuous scan of an exemplary room 150 by a wide angle IR detector 20 of an exemplary fire detection and suppression apparatus 10 embodying features of an exemplary embodiment of the present invention. As depicted in FIG. 2*a*, the exemplary fire detection and suppression apparatus 10 is mounted on the ceiling 151 of the room 150. Under normal (non-fire-hazard) conditions, the wide angle IR detector 20 performs a continuous scan of the room according to the wide angle cone-region view 120 depicted in FIG. 2*a*.

Figure 2B:
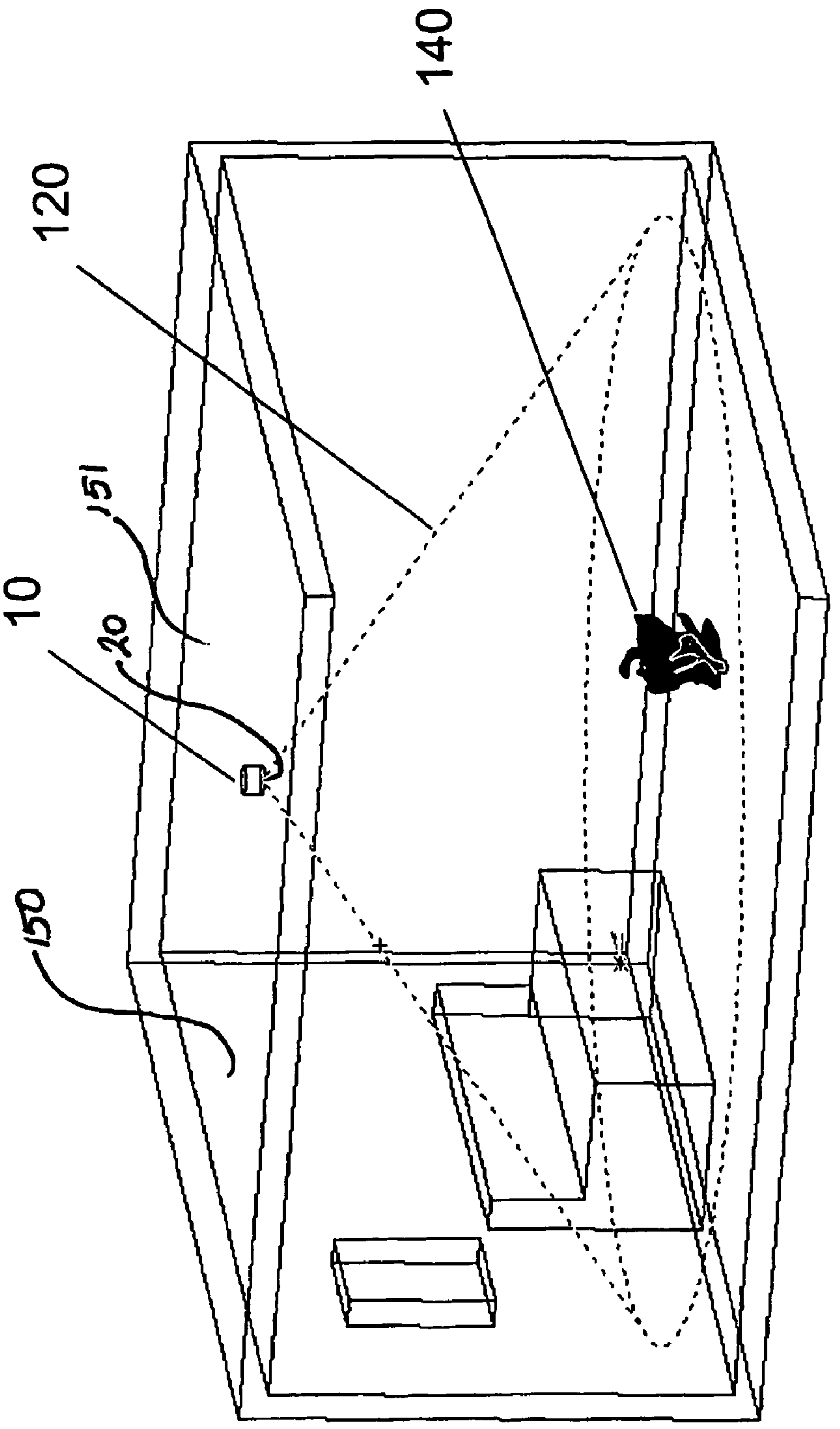
FIG. 2*b* is a perspective view of an exemplary fire hazard occurring in an exemplary wide angle cone-region continuous scan view of a wide angle IR detector of an exemplary embodiment of the present invention in an exemplary room.
Figure 2C:
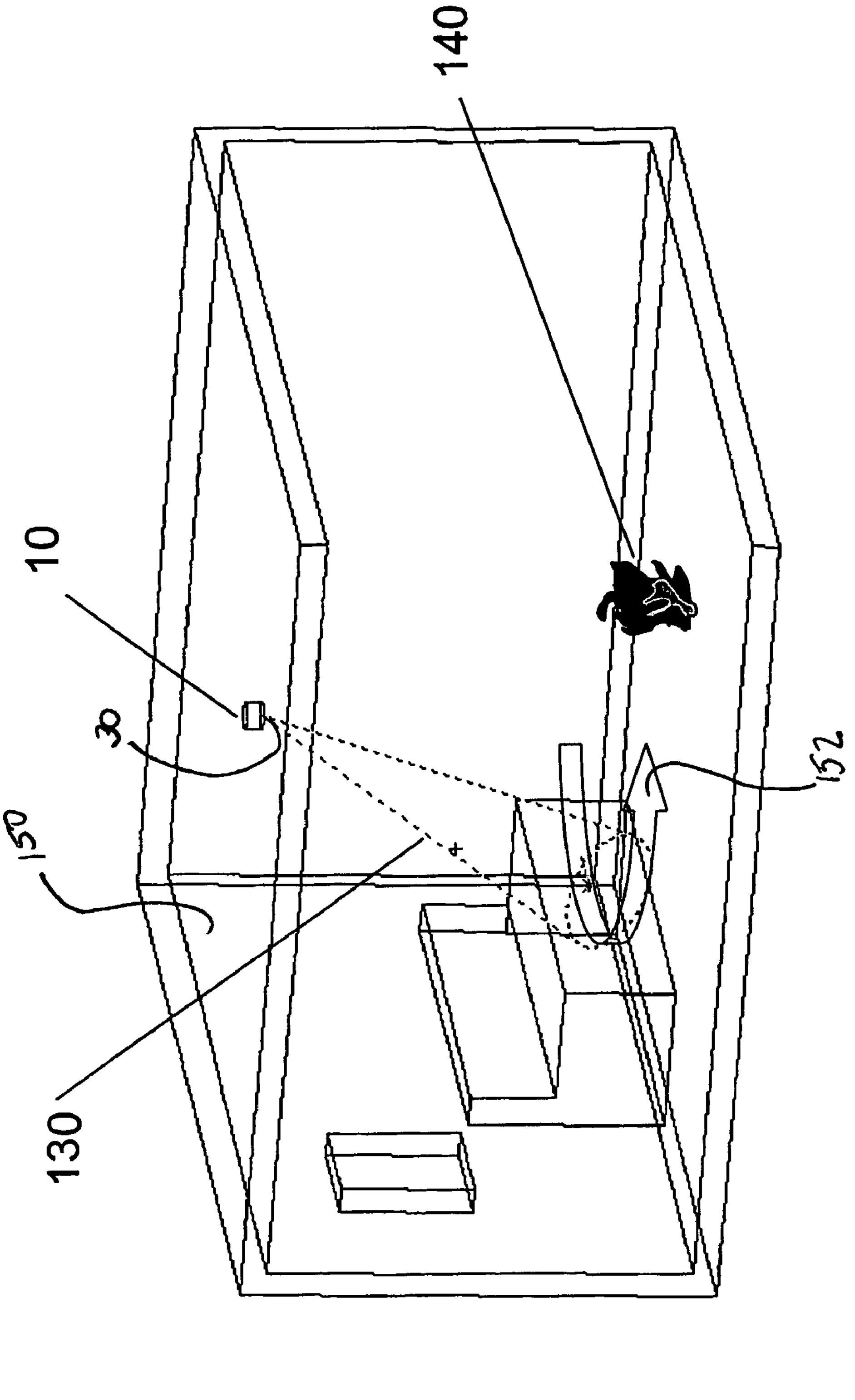
FIG. 2*c* is a perspective view of an exemplary narrow angle cone-region view of a narrow-angle IR detector of an exemplary embodiment of the present invention sweeping an exemplary room in azimuthal directions.
Figure 2D:
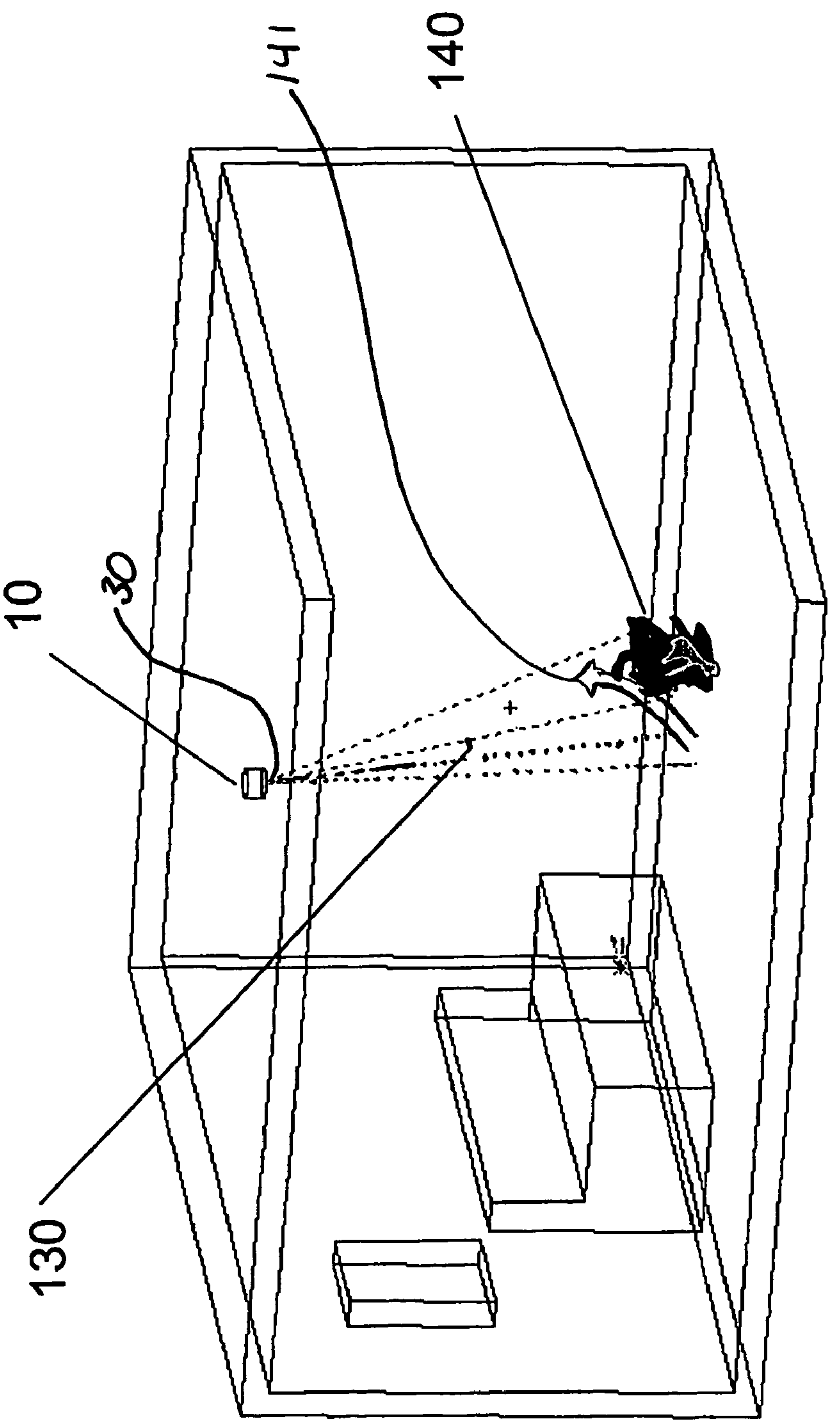
FIG. 2*d* is a perspective view of an exemplary narrow angle cone-region view of a narrow-angle IR detector of an exemplary embodiment of the present invention sweeping an exemplary room in elevational directions.

FIG. 2*b* is a perspective view of an exemplary fire hazard 140 occurring in the exemplary wide angle cone-region continuous scan view 120 of the wide angle IR detector 20 of the exemplary fire detection and suppression apparatus 10. As depicted in FIG. 2*c*, once the exemplary fire detection and suppression apparatus 10 detects a fire hazard 140, the apparatus 10 activates a narrow-angle IR detector 30 to sweep the exemplary room 150 in a narrow-angle cone-region view 138 first in the azimuthal directions toward the direction 152 of the detected fire hazard 140. As depicted in FIG. 2*d*, once the azimuthal direction of the fire hazard 140 has been detected, the narrow-angle IR detector 30 is directed to point at the azimuthal direction of the fire hazard and then begins to sweep in elevational directions 141 to determine the elevational direction of the fire hazard. Once the azimuthal and elevational directions of the fire hazard have been determined, a fire suppressant disbursement valve is pointed at the intersection of the azimuthal direction of the fire hazard and the elevational direction of the fire hazard, which represents the direction and location of the fire hazard 140.

Figure 2E:
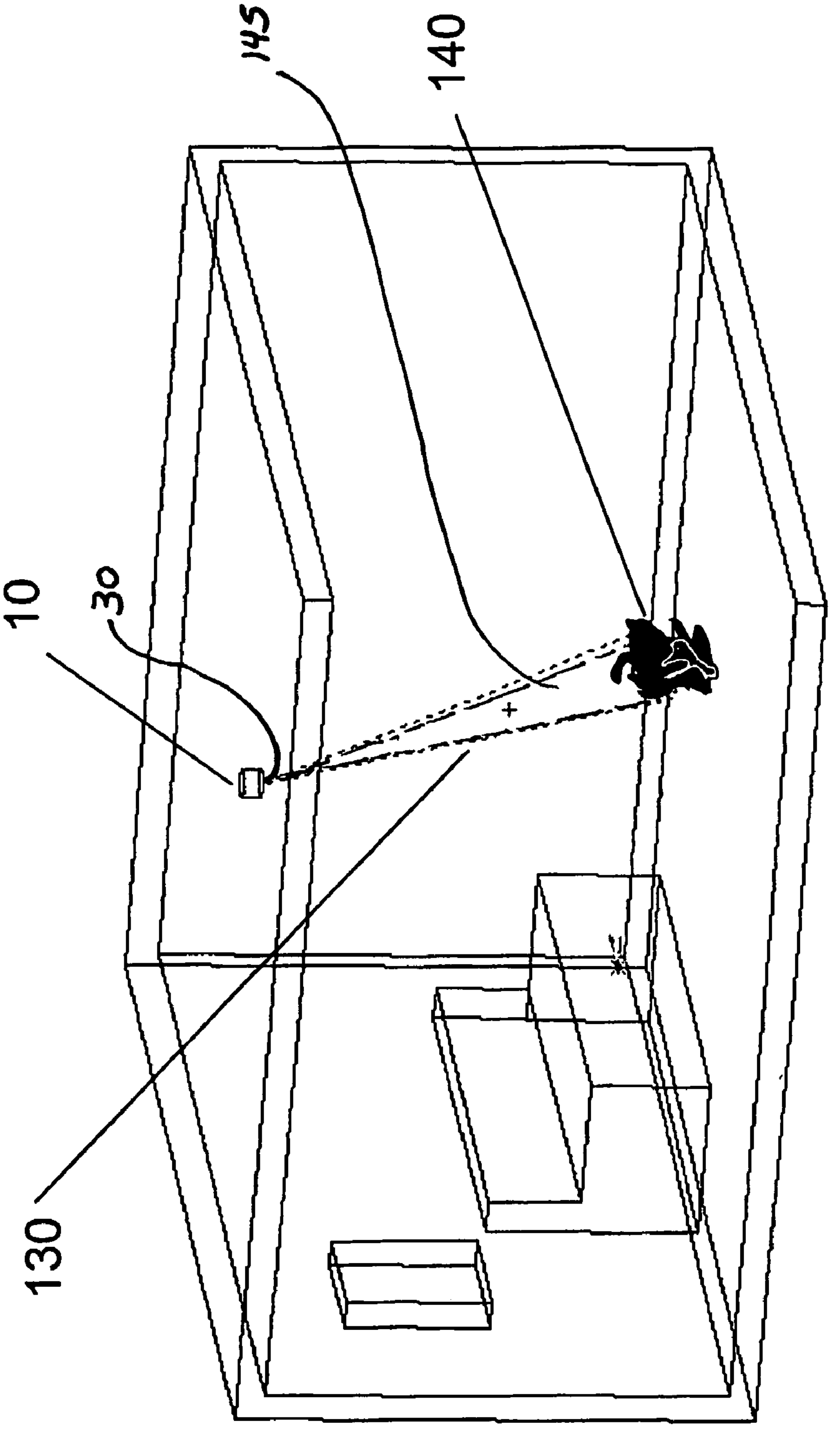
FIG. 2*e* is a perspective view of an exemplary embodiment of the present invention directing fire suppressant to extinguish a fire.

As depicted in FIG. 2*e*, by identifying the azimuthal and elevational directions of the fire, the micro-controller identifies a cone-regional location, e.g., 130, of the fire, e.g., 140. The cone-regional location, e.g., 130, of the fire, e.g., 140, identifies a region in which the fire is located, and by logical exclusion of the cone-regional location in which the fire is located, identifies locations where no fire is present. As depicted in FIG. 2*e*, once the narrow-angle IR detector 30 has identified the cone-regional location 130 of the fire hazard 140, the apparatus 10 directs fire suppressant 145 to extinguish the fire hazard 140.

The identification of the cone-regional location of the fire does not identify a distance of the fire from the fire detection and suppression apparatus 10 in a two-fire-energy-detector embodiment. Multiple locations of energy-detectors could be used in alternative embodiments to pinpoint the precise distance of the fire. Identifying the precise distance of the fire from the fire detection and suppression apparatus 10 would be used in such an alternative embodiment to adjust the pressure of the spray pattern of the fire suppressant.

In order to determine the direction corresponding to maximum IR energy in the exemplary embodiment of the invention, an Op-Amp is used to amplify the low level electrical signal to 0 to 5 Volts. To do this, the Op-Amp in the exemplary embodiment is set to amplify the low-level electrical signal with 1.2 Mega ohms (MΩ) feedback resistor. The Analog-to-Digital Converter (ADC) converts the amplified analog signal to a digital signal that is then processed by the micro-controller 100.

Figure 4:
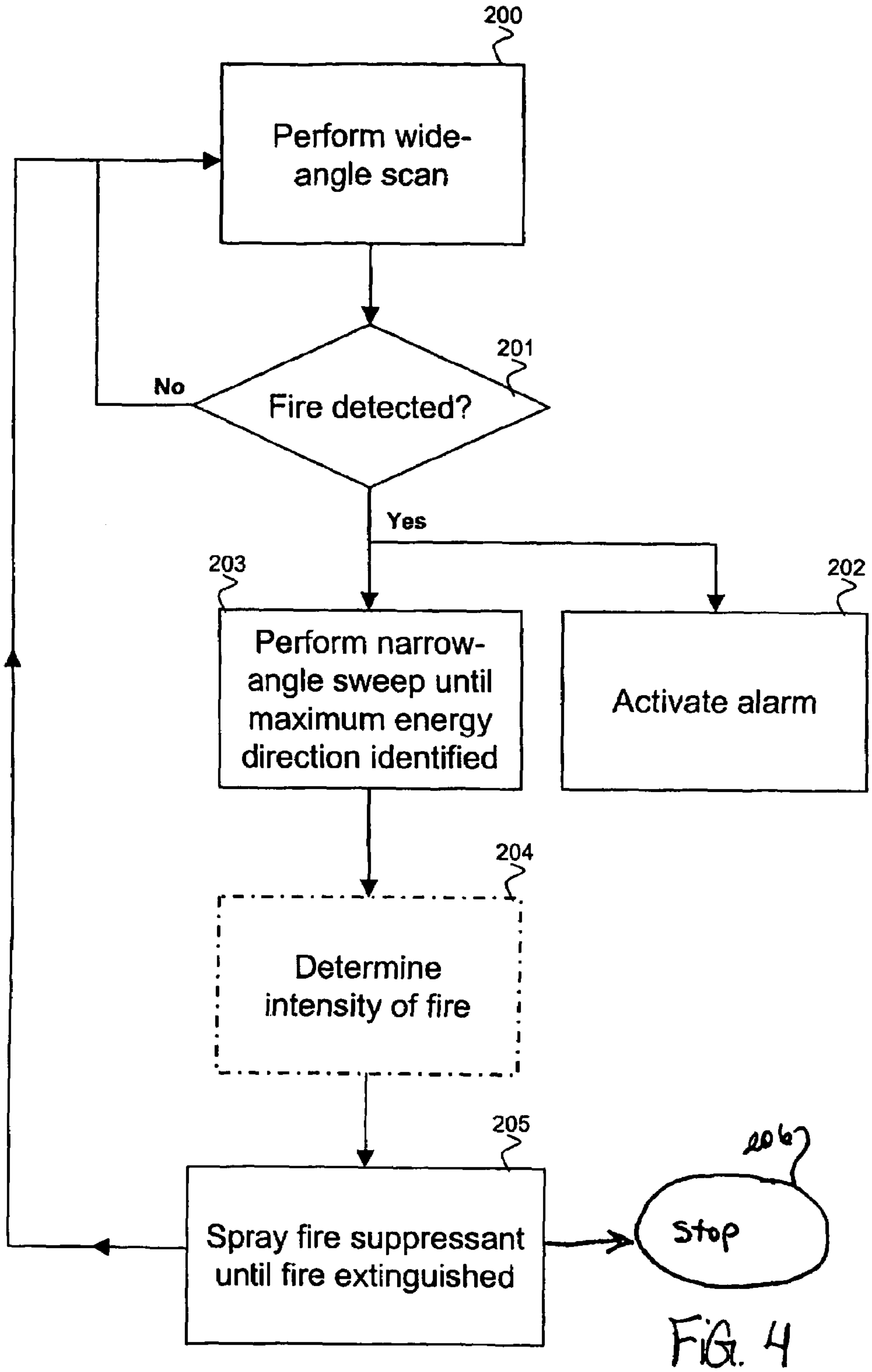
FIG. 4 is a high level logic flow diagram depicting the main logic functions performed by a micro-controller embodying exemplary features of the present invention.

FIG. 4 is a high level logic flow diagram depicting the main logic functions performed by the micro-controller 100 in an exemplary embodiment of the present invention. As depicted in FIG. 4, the micro-controller 100 is programmed to perform a wide-angle sweep, or scan, by the wide-angle IR detector of the area to be monitored 200. The micro-controller 100 is programmed to test whether or not a fire is detected 201. If a fire is detected, the micro-controller 100 activates an alarm 202 and performs a narrow-angle sweep with the narrow-angle IR detector until a maximum energy direction point is identified 203. Once a maximum energy direction point has been identified, the micro-controller 100 would be optionally programmed to determine the intensity 204 of the fire as that process is described in more detail below. The micro-controller 100 is programmed to then spray fire suppressant until the fire is extinguished or until the system 10 is turned off 205–206, or until the system 10 is reset at which point the system returns to again perform the wide-angle scan 200. Once the fire has been extinguished and the system has been reset, the micro-controller 100 is programmed to again activate and perform the wide-angle scan 200.

Figure 5:
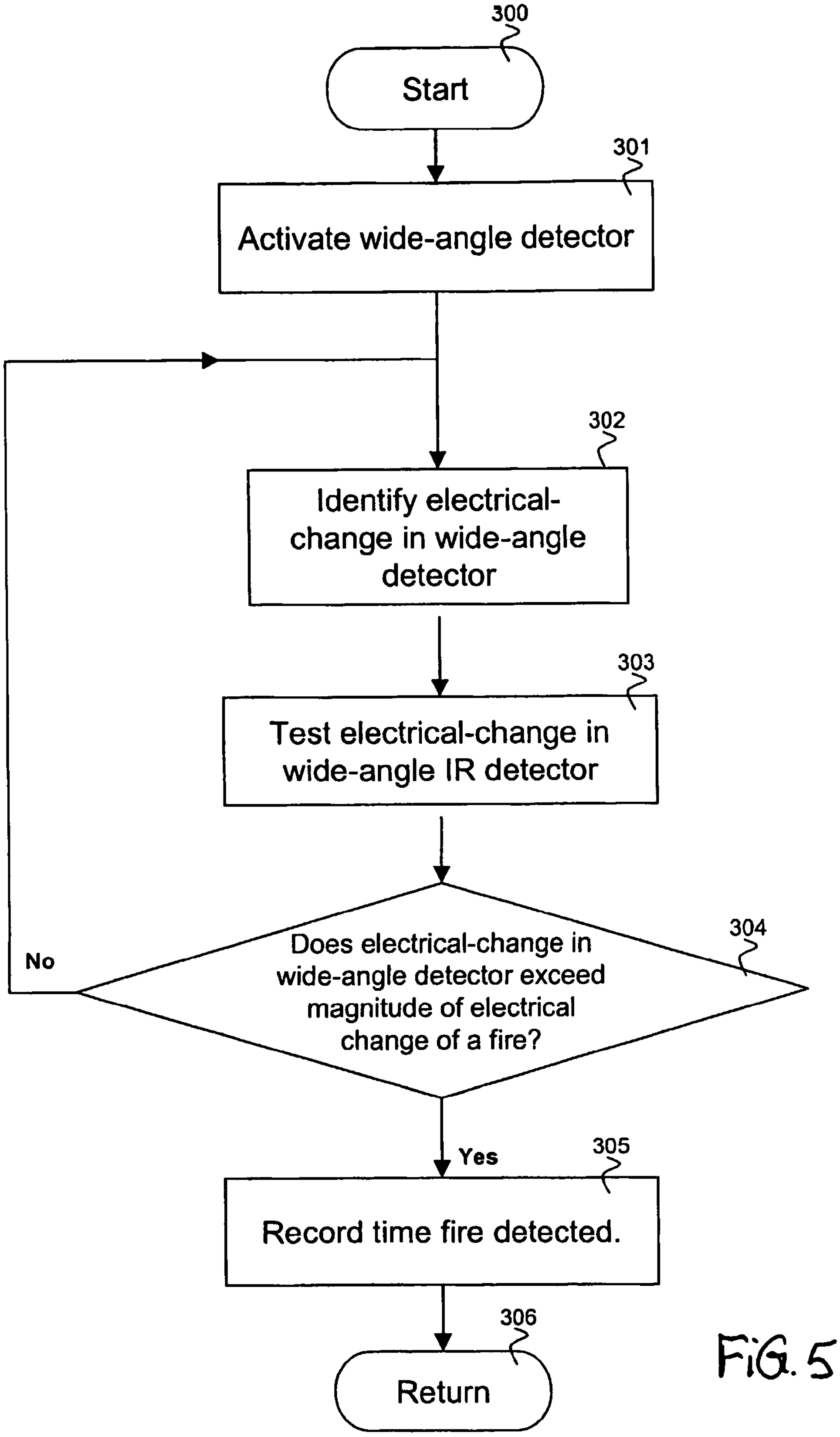
FIG. 5 is a high level logic flow diagram depicting wide-angle IR detector sweep logic functions performed by a micro-controller embodying exemplary features of the present invention.

FIG. 5 is a high level logic flow diagram depicting wide-angle IR detector sweep logic functions performed by the micro-controller 100 in an exemplary embodiment of the present invention. As depicted in FIG. 5, when the fire suppressant system 10 is turned on 300, the micro-controller 100 is programmed to activate the wide-angle IR detector 301. The micro-controller 100 is programmed to continuously query the AD converter to detect an electrical change in the wide-angle IR detector 302. The micro-controller 100 tests each electrical change in the wide-angle IR detector against a preset fire-level magnitude saved in the micro-controller memory 303 to determine whether or not the electrical change in the wide-angle IR detector exceeds the preset fire-level magnitude 304. If the electrical change in the wide-angle IR detector does not exceed the preset fire-level magnitude, the micro-controller 100 is programmed to continue to query the AD converter to detect an electrical change in the wide-angle IR detector 302. If, on the other hand, the electrical change in the wide-angle IR detector exceeds the preset fire-level magnitude, the micro-controller 100 would be programmed to record the time, and that fact, that a fire is detected 305 before returning to the main routine.

Figure 6:
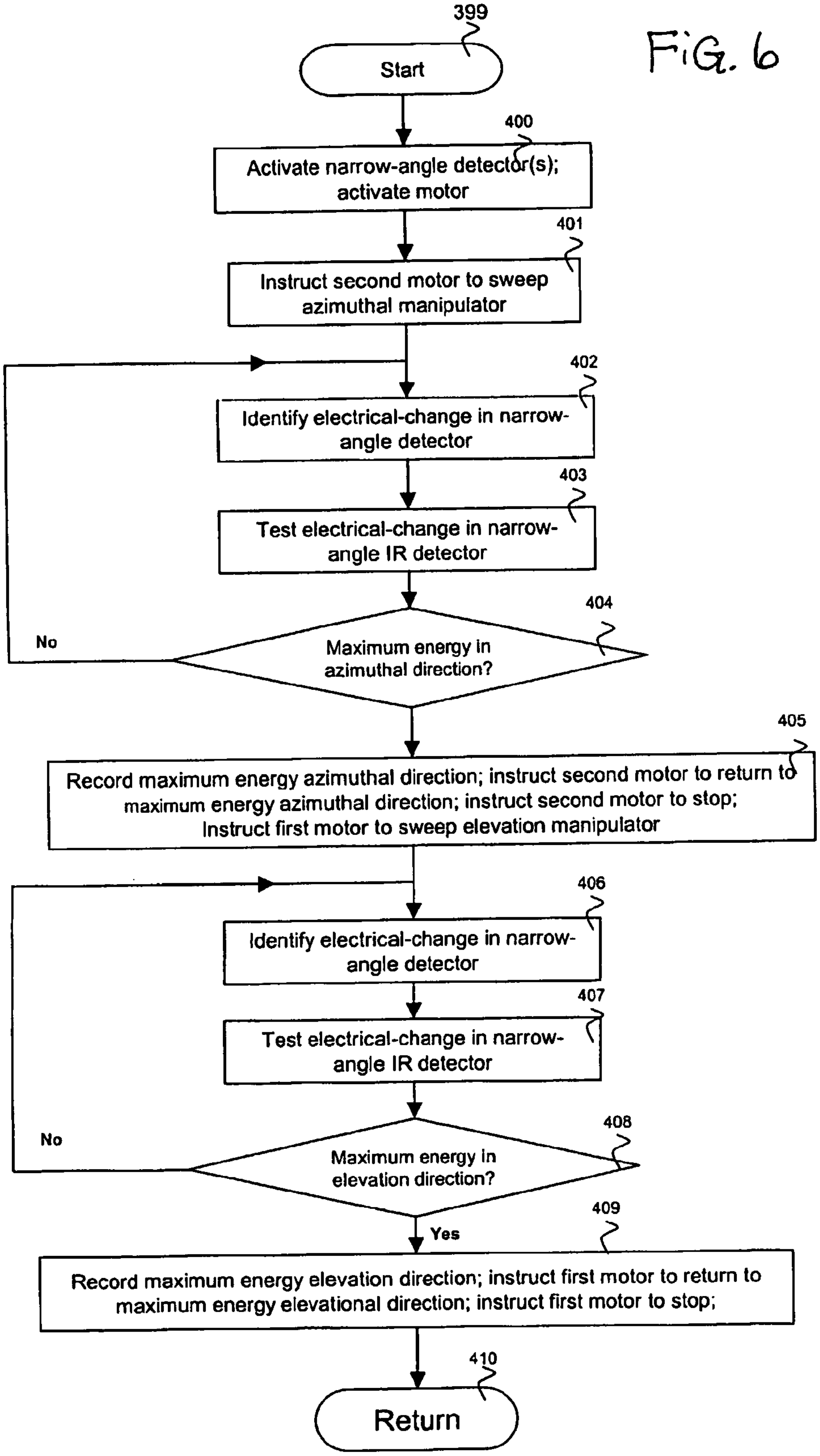
FIG. 6 is a high level logic flow diagram depicting narrow-angle IR detector sweep logic functions performed by a micro-controller embodying exemplary features of the present invention.

FIG. 6 is a high level logic flow diagram depicting narrow-angle IR detector sweep logic functions performed by the micro-controller 100 in an exemplary embodiment of the present invention. As depicted in FIG. 6, upon entering the narrow-angle IR detector sweep function 399, the micro-controller 100 is programmed to activate the narrow-angle IR detector(s) (30 in FIG. 1*a*) and activate the stepper-motors (90 and 91 in FIG. 1*a*) that drive the azimuthal (60 in FIG. 1*a*) and elevational (50 in FIG. 1*a*) manipulators 400 respectively.

As depicted in FIG. 6, the micro-controller 100 is programmed to instruct the first stepper-motor (90 in FIG. 1*a*) to sweep the azimuthal manipulator (60 in FIG. 1*a*) 401. The micro-controller 100 is programmed to query the AD converter to identify any electrical change in the narrow-angle IR detector 402, and to test any electrical change 403 to determine whether or not a maximum azimuthal energy direction point had been identified 404. If a maximum azimuthal point has not been identified, the micro-controller 100 is programmed to continue to query the AD converter for electrical changes in the narrow-angle IR detector 402.

Once a maximum azimuthal energy direction point is identified, the micro-controller 100 is programmed to instruct the first stepper-motor (90 in FIG. 1*a*) to return to the maximum azimuthal energy direction point, to instruct the first stepper-motor (90 in FIG. 1*a*) to stop, and to instruct the second stepper-motor (91 in FIG. 1*a*) to sweep the elevational manipulator (50 in FIG. 1*a*) 405. The micro-controller 100 will also be programmed to record the maximum azimuthal energy direction point.

Once the second stepper-motor (91 in FIG. 1*a*) begins to sweep the elevational manipulator (50 in FIG. 1*a*), the micro-controller 100 is programmed to query the AD converter to identify any electrical change in the narrow-angle IR detector 406, and to test any electrical change 407 to determine whether or not a maximum elevational energy direction point has been identified 408. If a maximum elevational point has not been identified, the micro-controller 100 is programmed to continue to query the AD converter for electrical changes in the narrow-angle IR detector 406.

Once a maximum elevational energy direction point is identified, the micro-controller 100 is programmed to instruct the second stepper-motor (91 in FIG. 1*a*) to return to the maximum elevational energy direction point, and to instruct the second stepper-motor (91 in FIG. 1*a*) to stop 409 before returning 410 to the main routine. The micro-controller 100 will be programmed to record the maximum elevational energy direction point.

Once the digital signal corresponding to the magnitude of a fire has been determined by the micro-controller, several different alternative algorithms could be used to determine the direction of maximum IR radiant energy. For example, a simple method for determining the direction of maximum IR radiant energy would be to sweep the narrow field-of-view IR detector 30 in all directions until the direction corresponding to maximum IR energy is determined. However, this method is not as reliable as other methods described below because the intensity of IR energy in any direction fluctuates over time due to fluctuations in the intensity of the fire.

An alternative method uses intensity (details for determining intensity are described further below), which is averaged over time. This alternative method eliminates the instability inherent with a fire, increasing signal reliability.

A more involved method uses a weighted averaging from multiple data sets in order to obtain a more reliable indication of direction corresponding to maximum intensity.

An even more advanced method uses the slope of the intensity as a function of angular position in order to determine the direction corresponding to the direction of fire. This method determines the point at which the slope of the intensity determined between a first data point proceeding a current position and second data point following the current position exceeds a preestablished value to determine if a peak had been reached.

Another alternative method combines the weighted-average and slope-of-intensity methods described above. Other alternative methods use other criteria to achieve a reliable indication of the peak direction.

In an exemplary embodiment of the invention, a nozzle 40 is connected to a hose 70. The hose 70 is connected to a supply of fire suppressant and is mounted on the elevational manipulator 50 of the movable platform 45. The hose 70 is attached to a valve 80 that is in a closed position until a fire is detected. The valve 80 is in a closed position in order to prevent the flow of fire suppressant. The nozzle 40 of the hose 70 is pointed in the same direction as the second IR detector 30.

Once a fire has been detected and the micro-controller 100 has manipulated the second IR detector 30 assembly to point toward the direction of the fire (the source of maximum IR energy), the micro-controller will direct the valve 80 to be opened so that the fire suppressant will flow out of the hose 70 through the nozzle 40 to release the fire suppressant directly at the source of the fire in order to extinguish the fire.

In the exemplary embodiment of the present invention, the micro-controller 100 would continue to periodically query both the first wide-angle IR detector 20 and the second narrow-angle IR detector 30 to verify that the release of the fire suppressant is effective at eliminating the fire to determine whether and when the fire has been extinguished. When the micro-controller 100 determines that the fire has been extinguished, the micro-controller 100 will direct the valve 80 to close in order to stop the further release of the fire suppressant.

In an alternative exemplary embodiment of the present invention, multiple narrow-angle IR detectors 30-1 through 30-*n* ("n" representing a number greater than 1) would be used. In one such alternative exemplary embodiment, each of the narrow-angle IR detectors 30-1 through 30-*n* would be sensitive to a different wavelength, or range of wavelengths, and each would be provided with an optical filter 35-1 through **35-*n* respectively. The optical filters 35-1 through 35-*n*** would filter unwanted portions of the electromagnetic spectrum.

In a further alternative exemplary embodiment using multiple narrow-angle IR detectors, the IR detectors 30-1 through **30-*n*** would be selected according to the materials from which the particular IR detector is made according to the sensitivity of the material to a particular wavelength of interest.

The purpose of using multiple narrow-angle IR detectors 30-1 through **30-*n* would be to provide the micro-controller 100 with information from which the micro-controller 100 could determine a value of the radiant intensity of a fire. Fire generates a broadband radiant energy over both the IR portion and the visible portion of the electromagnetic spectrum. By using multiple sensors that are sensitive at different wavelengths, the temperature of the fire (which is indicative of the strength of the fire hazard) can be determined. The higher the temperature of a fire, the shorter the wavelength of the peak radiant energy of the fire which is described by Wien's Displacement Law relating the peak wavelength to temperature ($\lambda_{max}T$=2897.6 um K). By using multiple IR detectors that are each sensitive to different wavelengths, the micro-controller 100 can identify the wavelength corresponding to the maximum energy of the fire. From the wavelength corresponding to the maximum energy, the micro-controller 100 can determine the radiant intensity of the fire, and can determine an approximation of the temperature of the fire. Once the approximate temperature of the flame is identified, the micro-controller 100** will be programmed to determine the relative intensity of the fire.

Depending on the strength of the fire, the micro-controller 100 will be programmed to control and adjust the spray pattern produced by the valve 80/hose 70/nozzle 40 assembly in order to achieve maximum fire suppression. The spray pattern can be adjusted by adjusting the size of the orifice through which the fire suppressant is released. Such adjustments would be provided by connecting a third stepper-motor (not pictured) to the valve 80/hose 70/nozzle 40 assembly.

Attempting to suppress a strong fire with a low-flow small-droplet size fire suppressant material can result in a substantial amount of the fire suppressant being either diverted or evaporated before the suppressant reaches the source of the fire. Therefore, in an embodiment of the present invention in which fire intensity is determined, if the relative intensity of the fire is high, the micro-controller 100 will be programmed to direct the third stepper-motor to adjust the orifice of the valve 80/hose 70/nozzle 40 assembly through which the fire suppressant is released to release the fire suppressant in a strong spray pattern to be directed to reach the flame at a pressure that will not tend to be redirected by a strong updraft from the fire.

In the case of a relatively low intensity fire, the high kinetic energy from an intensely directed fire suppressant could inadvertently knock material already engulfed by the fire to a different place previously not subject to the fire. Therefore, if the relative intensity of the fire is low (lower temperature flame and corresponding lower strength updraft), the micro-controller 100 will be programmed to direct the third stepper-motor to adjust the orifice of the valve 80/hose 70/nozzle 40 assembly through which the fire suppressant is released to release the fire suppressant in a spray pattern that will be more wide-spread and will be less intensely directed toward the point of highest energy. The more wide-spread, less intensely-directed spray pattern would result is a lower level of kinetic energy from the released fire suppressant which would be less likely to inadvertently knock material already engulfed by the fire to a different place previously not subject to the fire.

In the exemplary embodiment of the invention, most of the information necessary to operate the micro-controller 100, such as the information for controlling the stepper-motors 90 and 91, for communicating with the IR detectors 20 and 30, and for performing the logic to identify the direction and regional location of the fire, as well as other standard features, will be programmed into the micro-controller 100 prior to installation. However, micro-controller instructions that are specific to the operation of the individual application can be programmed after the sprinkler has been installed by communicating the specific information to the micro-controller 100 through a program instruction-receiving IR detector, which may be one of the first or second IR detectors 20 or 30, or which may be a separate IR detector that has been configured to receive such instructions and communicate them to the micro-controller 100. For example, instructions unique to the specific installation of the fire suppressant system 10 such as the size of the room, the type of hazard expected, regions not requiring fire protection, regions requiring increased fire protection, as well as other features can be easily programmed in the micro-controller through the program instruction-receiving IR detector.

The information collected by the micro-controller 100 that is necessary to respond to the fire hazard would be useful to fire investigators after the fire has been suppressed. Information such as the regional location where the hazard originated, the time that it started, the intensity of it, how quickly the fire grew as well as other information can be stored in the memory of the micro-controller 100 to be retrieved and reported at a later time to aid in the investigation by the governing agency.

The apparatus and methods of the exemplary embodiment of the present fire suppression invention provide a number of other advantages as compared to traditional fire suppression equipment. Several of the advantages result from the nearly instantaneous detection of a fire and activation of fire suppression. One such advantage is an increase in the probability that the fire will be suppressed and/or extinguished, thereby minimizing injury and property damage. By activating fire alarms during the earliest stage of a fire, occupants of a building on fire will have more time to escape the fire and fire departments will have a greater time in which to respond to the fire hazard.

Another advantage of the exemplary embodiment of the present invention is that the wide-angle IR detector 20 can be mounted anywhere as long as the wide-angle IR detector 20 has a clear and direct view of the area requiring fire protection. In one alternative exemplary embodiment of the present invention, the wide-angle IR detector 20 is located separately from the location of the rest of the fire suppression system 10. As opposed to the present invention, thermal-sensitive sensors of traditional thermal-reactive fire protection systems must be located in a place where the ceiling will trap gases from a fire so that the heat from the gases can be used to activate the fire suppression system.

The use of a narrow-angle IR detector 30 and AD Converter in the micro-controller 100 to identify the direction and regional location of the fire allows the micro-controller 100 to direct the nozzle 40 attached to the fire suppressant towards the fire to ensure that an optimum amount of fire suppressant is delivered at the fire with a spray pattern that is appropriate according to the intensity of the fire.

Because the present invention directs the fire suppressant to the exact direction and regional location of a fire, the present invention does not direct fire suppressant to locations unaffected by the fire. By not wasting fire suppressant on locations of the facility unaffected by the fire, more fire suppressant (or at a higher system pressure) will be available at locations where fire suppressant is vital for effective suppression of the fire hazard. Also, by not directing the fire suppressant in directions where fire hazard does not exist as is done by traditional fire suppression systems, the present invention will not unnecessarily damage property unaffected by the fire.

Another advantage of the present invention is that the ability to adjust the spray pattern and pressure of the release of a fire suppressant enhances the ability of the fire suppressant equipment to successfully suppress and/or extinguish a fire without causing an unnecessary spread of the fire.

FURTHER ALTERNATIVE EMBODIMENTS

Various elevational and azimuthal mechanisms can be used without departing from the spirit of the present invention. The elevational and azimuthal mechanisms disclosed above with regard to the exemplary embodiment depicted in FIG. 1*a* are exemplary and are not a limitation of the invention. For example, FIG. 1*b* is a perspective view of an alternative exemplary fire detection and suppression apparatus configuration of the above-described exemplary elements embodying features of the present invention that uses an alternative elevational platform mechanism.

Figure 1B:
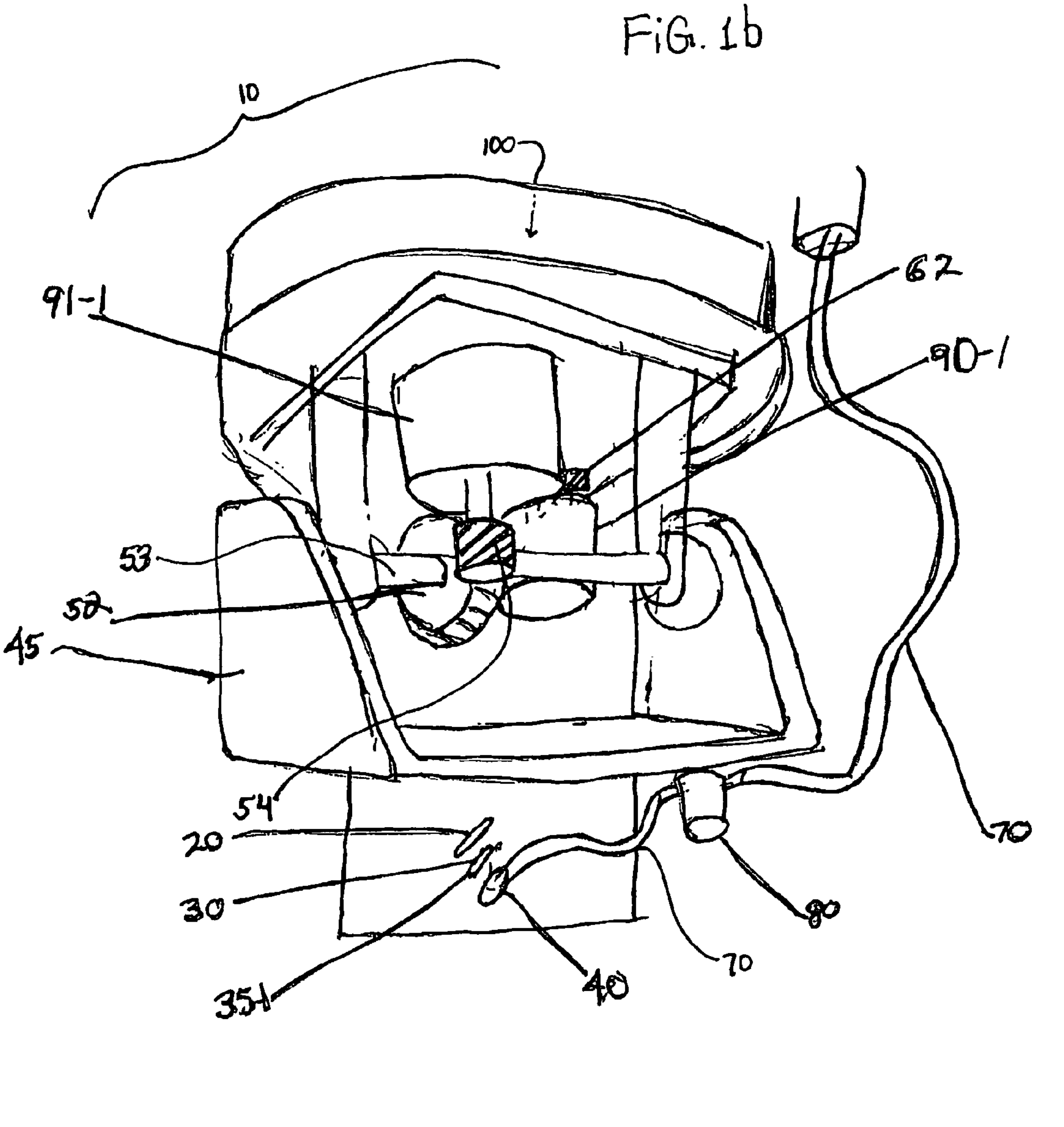
FIG. 1*b* is a perspective view of an alternative exemplary fire detection and suppression apparatus embodying features of the present invention.

The alternative embodiment depicted in FIG. 1*b* uses an elevational platform such as that conventionally used to elevationally sweep a video camera such as in a security surveillance video camera apparatus installation. In the alternative embodiment depicted in FIG. 1*b*, the elevational manipulator comprises a synchronous motor 91-1 that drives a first cogged wheel 54; the cogs of the first cog wheel 54 engage with the cogs of a second cogged wheel 52 that is mounted on an axle 53 about which the elevational platform 45 can rotate. When the synchronous motor 91-1 activates the first cogged wheel 54, the cogs of the first cog wheel 54 engage the cogs of the second cogged wheel 52 to turn the second cogged wheel 52 and the axle 53, which in turn raises or lowers, as the case may be, the elevation of the elevational platform 45. Other aspects of this alternative embodiment are similar to the exemplary embodiment depicted in FIG. 1*a* and are not described further here.

The major components used in building the alternative exemplary embodiment depicted in FIG. 1*b* and the relevant commercially available sources are listed in FIG. 7 under the title of "Alternate Embodiment".

Although the exemplary embodiment of the present invention uses electromagnetic wavelength detectors, such as IR detectors, as fire-energy detection devices, thermal-sensitive detectors, including a bolometer, a thermocoupler, a thermister, as well as any other devices that are sensitive to thermal radiation, could also be used as fire-energy detection devices without departing from the spirit of the invention. In an alternative embodiment using thermal sensitive detectors as the fire-energy detection devices of the invention, an optical filter would be utilized to eliminate unwanted thermal radiation that might produce false fire hazard while allowing thermal radiation that would be indicative of a fire hazard to pass through. Although such alternative thermal-sensitive embodiments of the invention would be subject to thermal lag, such embodiments would nevertheless provide the detection of the direction and regional location of the fire such that the micro-controller would control the spray pattern and direction of the release of fire suppressant according to the invention.

Someone with ordinary skill in the art will understand that the use of two detectors, such as in the exemplary embodiment, is illustrative. The micro-controller could sweep a single narrow-angle detector (electromagnetic wavelength detectors, such as IR detectors, or thermal-sensitive detectors such as bolometers, thermocouplers, and thermisters) without departing from the spirit of the invention.

FACSIMILE REPRODUCTION OF COPYRIGHT MATERIAL

A portion of the disclosure of this patent document contains material which is subject to copyright protection by the copyright owner, Benjamin Tan or his successors and assigns. The copyright owner has no objection to the facsimile reproduction by anyone of the patent document or the patent disclosure, as it appears in the Patent and Trademark Office patent file or records, but otherwise reserves all copyright rights whatsoever.

ILLUSTRATIVE EMBODIMENTS

Although this invention has been described in certain specific embodiments, many additional modifications and variations would be apparent to those skilled in the art. It is, therefore, to be understood that this invention may be practiced otherwise than as specifically described. Thus, the embodiments of the invention described herein should be considered in all respects as illustrative and not restrictive, the scope of the invention to be determined by the appended claims and their equivalents rather than the foregoing description.

What is claimed is:

1. A fire detection and suppression apparatus, said fire detection and suppression apparatus comprising:
- a wide-angle infra-red detector for detecting a presence of a fire;
- a narrow-angle infra-red detector for detecting a direction of the fire;
- a nozzle attached to a supply of fire suppressant material; and
- a micro-controller programmed to continuously monitor the wide-angle infra-red detector to determine the presence of fire, wherein the narrow-angle infra-red detector and the nozzle are mounted on a platform that is movable in a plurality of directions and wherein the narrow-angle infra-red detector and the nozzle are both directed to a single point.

2. The fire detection and suppression apparatus of claim 1, wherein said micro-controller is further programmed to:
- manipulate said platform to point said narrow-angle infra-red detector in the direction of the fire; and
- spray a fire suppressant through said nozzle.

3. A method using a microcontroller for detecting and suppressing a fire, said method comprising:
- monitoring a digital signal from an analog-to-digital converter representing an electrical characteristic change to a first fire-energy detector connected to the analog-to-digital converter until the digital signal is equal to or greater than a first pre-established value, wherein said first fire-energy detector is capable of detecting fire-energy in a first angle of view wherein said first angle of view has a first width; and after the digital signal is equal to or greater than the first pre-established value, manipulating a platform on which a second fire-energy detector and a nozzle are mounted to sweep across an area of view in a plurality of directions until a direction of the fire is determined, wherein said second fire-energy detector is capable of detecting fire-energy in a second angle of view, wherein the second angle of view has a second width, wherein the second width is narrower than the first width, wherein the nozzle is connected to a supply of fire suppressant, and wherein the second fire-energy detector and the nozzle are each directed to a common view relative to the platform.

4. The method of claim 3, said method further comprising:

after the direction of the fire is determined, manipulating the platform to point the nozzle to the direction of the fire.

5. The method of claim 4, said method further comprising:

opening a valve between the nozzle and the supply of fire suppressant; and controlling delivery of fire suppressant.

* * * * *